United States Patent [19]
Vollmer et al.

[11] 3,960,358
[45] June 1, 1976

[54] PRESSURE REDUCER

[76] Inventors: Rudolf Vollmer, 23 Friedrich Holderlinstrasse; Bernhard W. Braukmann, 1 Am Rosenberg, both of Mosbach 695, Germany

[22] Filed: Feb. 11, 1975

[21] Appl. No.: 548,909

[52] U.S. Cl. ........................ 251/61.5; 137/505.18; 137/549; 251/282; 251/118
[51] Int. Cl.² .................................. F16K 31/145
[58] Field of Search .............. 137/505.18; 251/61.5, 251/282

[56] References Cited
UNITED STATES PATENTS

| | | | |
|---|---|---|---|
| 1,143,999 | 6/1915 | Rosencraus | 251/282 X |
| 2,882,918 | 4/1959 | Wright | 251/282 X |
| 3,319,649 | 5/1967 | Cummins | 137/505.18 |
| 3,794,063 | 2/1974 | Carroll | 137/505.18 X |

*Primary Examiner*—Harold W. Weakley
*Attorney, Agent, or Firm*—William T. Howell

[57] ABSTRACT

A pressure reducer has a housing with an inlet and an outlet. A valve disc is located in the housing and a valve stem reciprocally and sealably moves in the valve disc with the outer end secured to a resilient diaphragm. The inner end of the valve stem extends into the inlet and is secured to a tubular closure member which is sealingly positioned in the inlet and is engageable with the valve disc. The surface of the tubular member subjected to pressure in the housing is adapted to equal the combined subjected to opposed pressure surfaces of the tubular member in the inlet and the end of the valve stem to which it is secured. Screens are provided around the tubular member.

7 Claims, 9 Drawing Figures

PRESSURE REDUCER

FIELD OF THE INVENTION

This invention relates to pressure reducers used in liquid or gaseous systems more especially for domestic water installations.

PRIOR ART

For pressure relieving purposes it is known to fit pressure reducers with a cylinder and cooperating piston but this results in an increase in cost as compared with pressure reducers which incorporate a regulator consisting of a resilient diaphragm acting on a valve stem secured to a closure member engageable with a valve disc.

SUMMARY OF THE INVENTION

The pressure reducer of the invention is of the latter type referred to above and it has a housing with an inlet and an outlet, the housing enclosing a wall providing a chamber which forms with the housing a diverting channel communicating with the inlet. The chamber has two openings, the first communicating with the channel and the second with the outlet. The chamber also has an internal valve disc. Slidably and sealably located in the first opening is a tubular member secured to one end of a valve stem which extends through the valve disc in sliding and sealing relationship, the other end of the valve stem being attached to a resilient diaphragm located outward of the chamber.

It will be appreciated that fluid flow from the inlet will continue through the tubular member into the chamber and then to the outlet as long as the pressure exerted on the tubular member and valve stem exterior of the chamber is insufficient to move the inner end of the member into engagement with the valve disc. It will also be appreciated that the initial pressure not only acts on the tubular member and valve stem exterior of the chamber but also on the inner end of the tubular member located in the chamber.

According to the invention the surface of the inner end of the tubular member, i.e. within the chamber, subjected to initial pressure is enlarged by comparison with the surface of the outer end of the tubular member by an amount equal to the surface of the valve stem exterior of the chamber and subjected to the initial pressure. In this manner a balance is achieved between the displacing forces acting in each direction by making the effective areas of the displaceable system pointing in opposed directions equal. The pressure on the opposed sides of the struts connecting the valve stem to the tubular member cancels out and need not be taken into consideration in the design outlined above.

A preferred form of the invention involves providing an outwardly disposed flange on the inner end of the tubular member located in the chamber, the effective area of the flange subjected to initial pressure being equivalent to the combined area of the other end of the tubular member and the cross section of the valve stem. A particular advantage of this arrangement is that the underside of the flange provides a surface area exposed to back pressure which presses the tubular member against the valve seat but this force simply acts against the spring loaded resilient diaphragm because the initial forces are equally balanced as explained above. Hence the forces acting on the pressure reducer are determined entirely by the spring force of the diaphragm and the back pressure acting on the flange.

A further development of the invention is that the inner end of the tubular member with its flange is expanded to resemble a nozzle. This configuration not only has rheological advantages but also makes it simpler to form the sealing edge on the outer edge of the flange.

Alternatively the sealing edge may be formed on the valve disc to bear solely against the outwardly projecting flange on the tubular member.

According to another variant of the invention, the outwardly projecting flange may be wedge shaped to provide high lift assistance.

A further characteristic of the invention is that the valve disc in the chamber is part of a retaining flange having sealed attachment to the housing. The valve disc, tubular member and stem with connecting ribs may be made of plastic. Also the whole may be assembled externally of the pressure reducer housing and installed as a complete unit.

Strict requirements relating to noise are applicable to pressure reducers, especially those fitted in domestic water installations. In a further configuration of the invention, therefore, provision is made for the closing element and the valve disc to be enclosed, at least in the vicinity of the sealing plane, by an adjacent screen-like element. Thus all of the medium emerging from the gap between the valve seat and the lifted closure element flows through the screen-like element mentioned above. This sharply reduces the velocity of the flow and produces turbulence. The result of this is that the liquid impinges at a lower velocity upon the wall of the chamber which surrounds the said screen-like element. The desired reduction in noise is brought about by this reduced impingement velocity. However, another equally significant advantage is obtained, namely this slowing down of the emerging medium makes it possible to reduce the size of the chamber, and thus the size of the pressure reducer housing, at least in this area.

In order to ensure that the total flow of medium passes through the screen-like element, it is desirable to make this element longer than the height of the flow running radially from inside to outside. According to one particularly preferred form of execution of the invention, therefore, the said screen-like element is in the form of a cylinder with its two ends pressing sealingly against the wall areas associated therewith. In this latter case, the only path left for the medium is through the mesh in the said screen-like element.

According to another characteristic of the invention, the screen-like element is surrounded, preferably concentrically, by at least one other screen-like element. It is desirable to leave a small radial space between the adjacent elements.

In still another configuration of the invention, the two ends of the screen-like element of elements are supported laterally or, more particularly, engage in annular grooves in the walls associated therewith. This ensures satisfactory retention of the said elements, which is highly important when the flow is strong.

In the case of a pressure reducer having a dirt-trapping screen, or the like, arranged in front of the tubular member, according to the invention the mesh apertures in this dirt-trapping screen are smaller than those in the screen-like element mentioned above. This ensures that any particles passing through the dirt-trapping screen will also pass through the screen-like element and cannot therefore block the latter.

BRIEF DESCRIPTION OF THE DRAWINGS

The invention will now be described in relation to the accompanying drawings in which.

DESCRIPTION OF THE INVENTION

Figure 1:
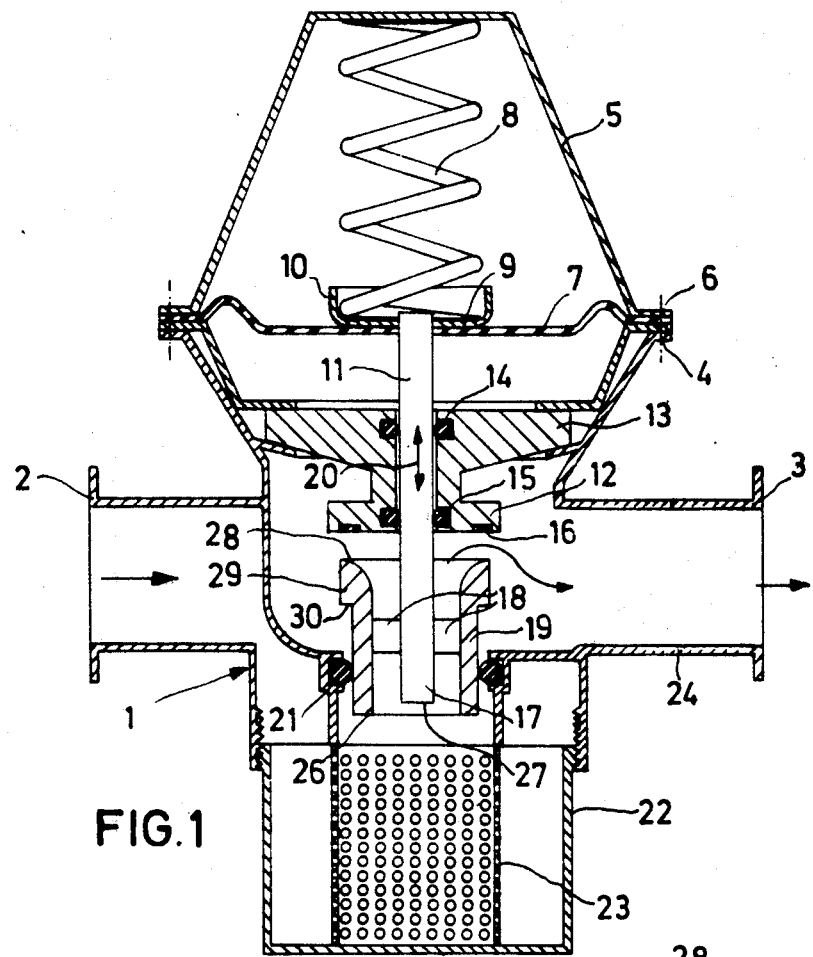
FIG. 1 shows a vertical section through a first embodiment.

Housing 1 of the pressure reducer according to the invention has a flange 2 to connect the unit to the supply line, a flange 3 for the continuation of the line, and an upper flange 4 to which spring cover 5 is attached. Clamped between said flange 4 and flange 6 of spring cover 5 is the outer edge of a diaphragm 7, to which pressure is applied by means of a spiral compressing spring 8, the upper end of which bears against spring cover 5. Arranged between the lower end of the spring 8 and the diaphragm 7 is a washer 9, the edge 10 of which is turned up to prevent lateral movement of the lower end of the spring 8.

Valve stem 11 is rigidly attached to diaphragm 7, the stem 11 passing through a valve disc 12 secured in the housing by an integral retaining flange 13 at the top held detachably in the upper portion of the housing 1. Retaining flange 13 is sealed off from the housing and valve stem 11 is sealed off from the valve disc 12 and the retaining flange 13 integral therewith. Internal sealing is provided by two O-rings 14, 15 arranged in appropriate grooves in parts 12, 13. Valve disc 12 may also be provided with an inserted or applied seal 16.

A tubular valve member 19 is attached to lower end 17 of the valve stem 11 by means of a web 18. This means that the tubular member 19 and valve stem 11 may move up and down together in the direction of double arrow 20. The tubular valve member 19 is sealed off from the housing 1 by means of an O-ring 21 inserted into a groove in the housing 1. Sealing rings other than O-rings may also be used.

Lower end 22 of the housing 1, which is cup-shaped, is detachable, being attached to the remainder of the housing 1 by means of a thread, for example. This cup 22 accommodates a screen 23, the upper and lower ends of which are supported sealingly, and through which the flow is from outside to inside. From the interior of the screen 23 the medium flows through the tubular member 19 and into outlet connector 24 of the pressure reducer.

It may be gathered from the foregoing that both the lower end-face 26 of tubular 19, and the end-face, parallel therewith, of free end 27 of valve stem 11 are acted upon the initial pressure. The same applies to the upper, nozzle-shaped end-face 28 of tubular member 19. According to the invention, a flange 29 is formed on the outside of the tubular member 19, on the upper end thereof facing valve disc 12, this upper end-face 28, or the projection thereof onto a plane perpendicular to the axis of the valve-stem 11, being larger than the lower end-face 26 by the area of the lower end 27 of the valve stem 11. Because the area of the annular upper-flange end-face, is equal to the area of free end 27 of valve stem 11, and the tubular member 19, as regards initial pressure, there is no force acting upon the latter. The forces produced by initial pressure, and acting upon the top and bottom surfaces of web 18, cancel each other out.

Back pressure acts upon bottom surface 30 of flange 29 and upon diaphragm 7, causing the tubular member 19 and valve-stem 11 to move upwardly. This movement is opposed by the force of compression spring 8. The displaceable system is therefore at rest whenever these two forces are of equal magnitude.

Figure 2:
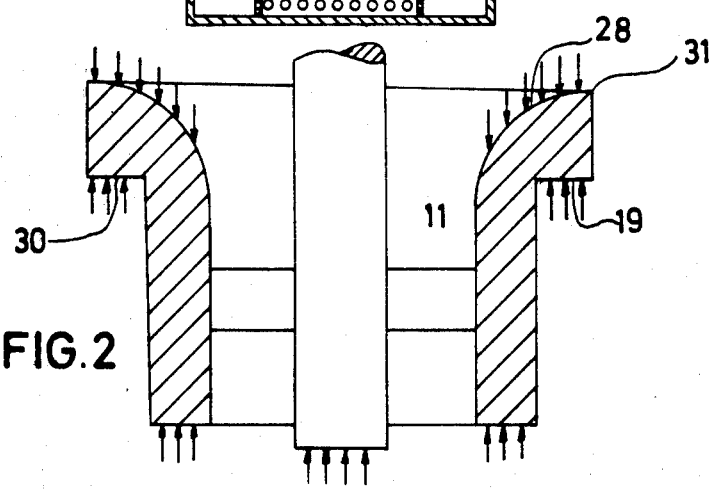
FIG. 2 is a view of the tubular member and of the lower end of the valve stem, on an enlarged scale.
Figure 3:
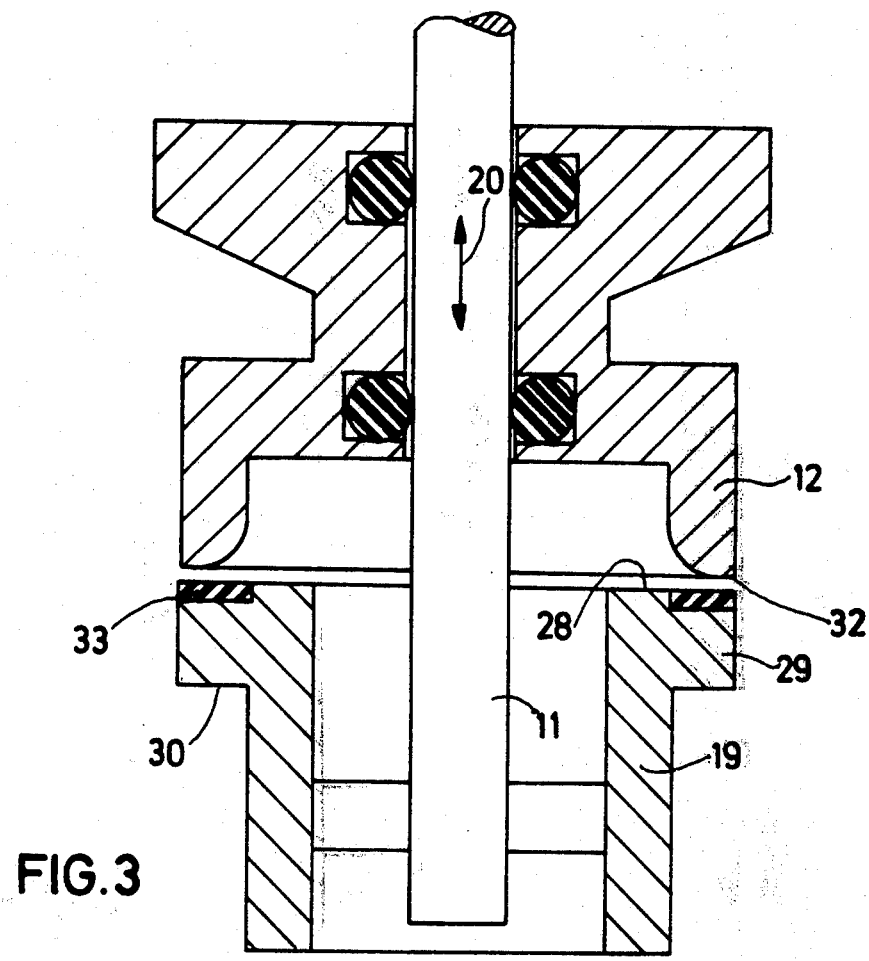
FIG. 3 is a view of a second example of a valve disc and cooperating tubular member, also enlarged.

In the example of embodiment illustrated in FIG. 1, the funnel shaped design of the upper end of the tubular member produces an outer sealing edge 31 which cooperates with seal 16 or, generally speaking, with valve disc 12 (see also FIG. 2). In the variant shown in FIG. 3, the reverse is the case, sealing edge 32 being formed on the free bottom end of valve disc 12 with the upper end-face 28 of tubular member 19 being made flat and at right angles to the direction of flow 20. An additional sealing ring 33 is inserted into, or applied to, the top surface of the tubular member 19. However, as in the case of the example of embodiment illustrated in FIG. 1, this may be dispensed with if an appropriate material is used for the whole of part 19.

Figure 5:
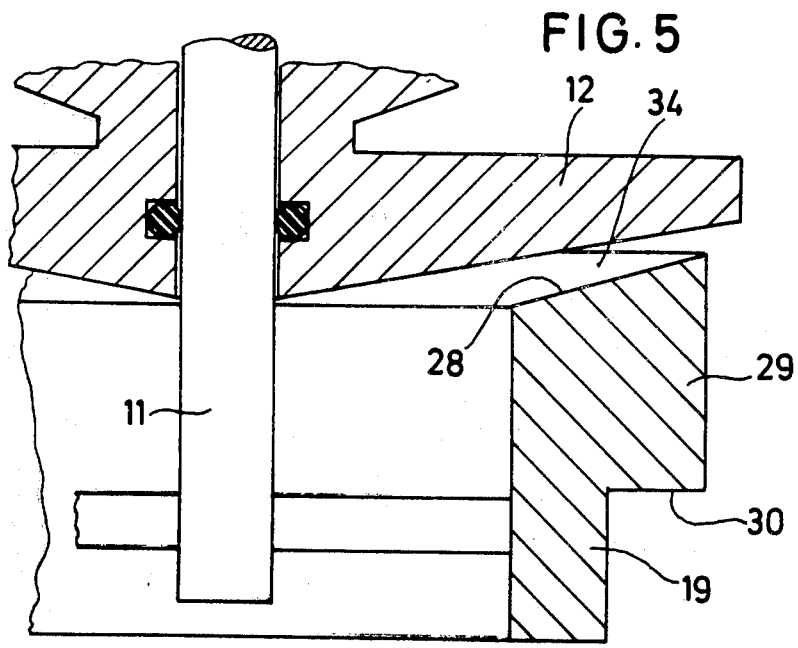
FIG. 5 is still another example of embodiment corresponding to FIG. 2.

In the variant illustrated in FIG. 5, neither of the two sealing surfaces is at right angles to the longitudinal axis of the valve-stem; instead, the said surfaces run obliquely downwards, but at different angles, so that, as in the other variants, the medium may enter the gap 34, the cross section of which is in the form of a wedge or the like, and may thus exert the desired pressure effect.

Figure 4:
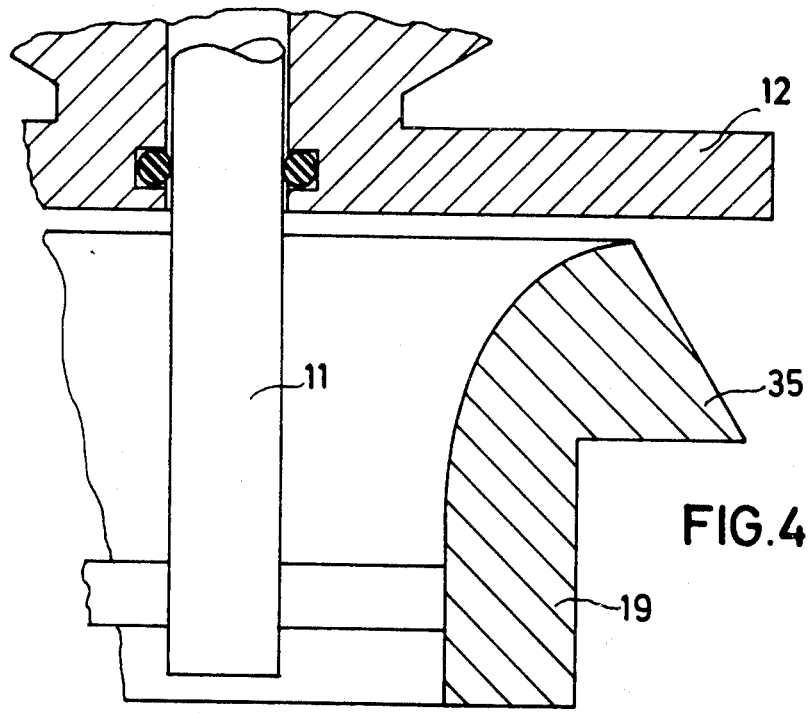
FIG. 4 is a view of a modified varient of FIG. 2.

In FIG. 4 the valve-disc 12 is again flat and tubular member 19 again corresponds essentially to that illustrated in FIGS. 1 and 2. Free end 35 of the flange, however, is somewhat different, being triangular or wedge-shaped in cross section, with a horizontal lower surface and an upper surface sloping from top to bottom. This design produces a stabilizing effect when the valve is open.

Figure 6:
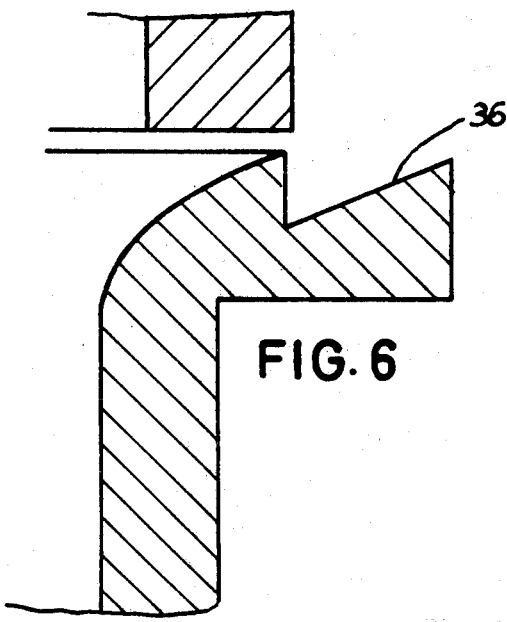
FIGS. 6,7,8, are three different examples of a high-lift aid.
Figure 7:
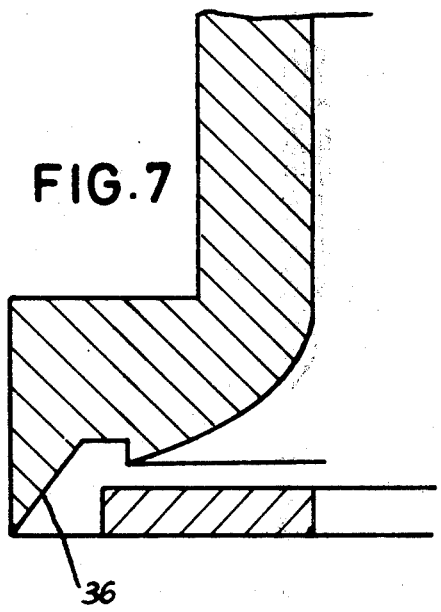
Figure 8:
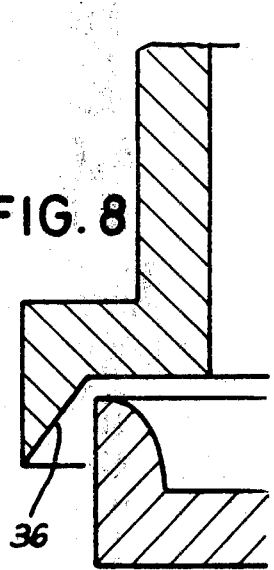
Figure 9:
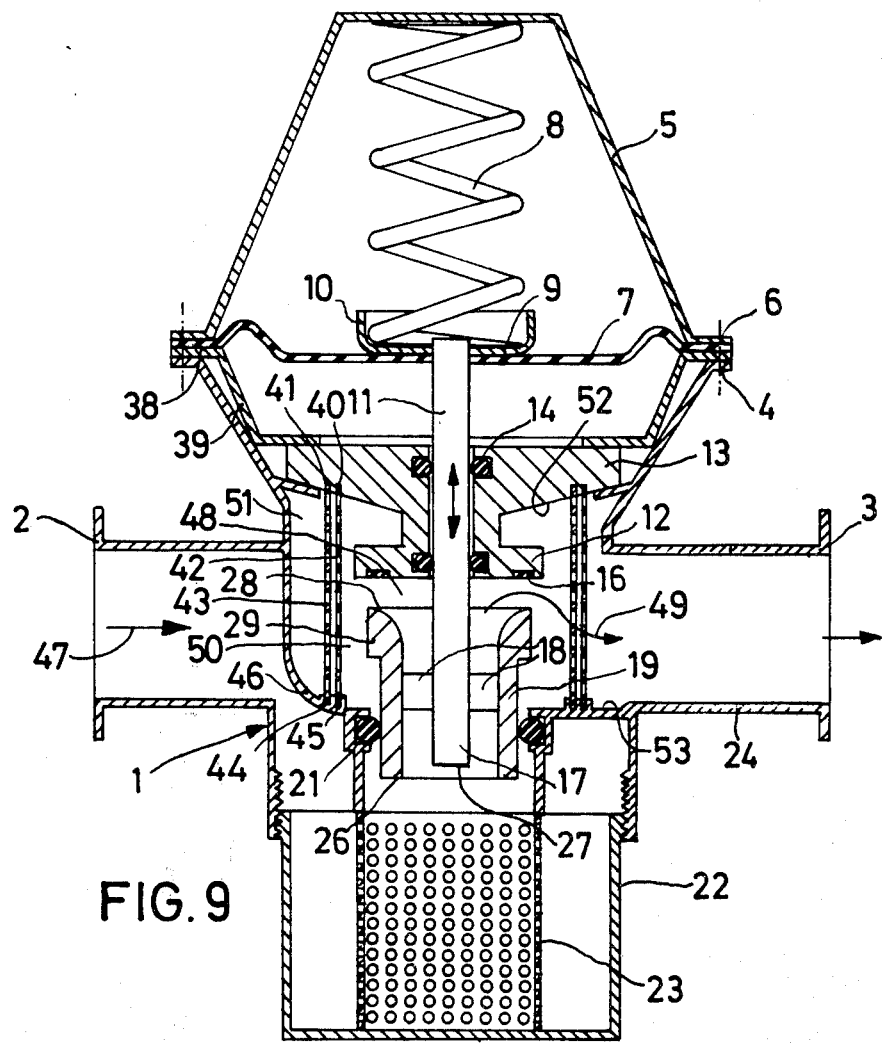
FIG. 9 is a vertical section, corresponding to FIG. 1, of a further embodiment.

FIGS. 6 to 8 show various possible designs of the specially provided high-lift aid, the high-lift edge being marked 36.

As already indicated, the outer edge of diaphragm 7 is clamped between flange 4 of the housing 1 and flange 6 of spring cover 5. Also secured in this location is edge 38 of a dished hold-down 39 for retaining flange 13 which is made integral with valve-seat 12. Two concentric, annular grooves 40, 41 are cut into the surface of retaining flange 13. These grooves 40, 41 accommodate the upper ends of two screen-like elements 42, 43 arranged concentrically in relation to each other, the lower ends of the said elements being accommodated in corresponding annular grooves 44, 45 which open upwardly out of internal wall 46 of the housing 1.

It is particularly important for the medium arriving in the direction of arrow 47, which may, if necessary, pass through a dirt-trapping screen 23 before entering the tubular member 19, to flow through gap 48 in the direction of arrow 49, i.e. radially from inside to outside.

After leaving gap 48, the medium flows radially through screen-like element 42 and then through the screen-like element 43. These two elements divide the chamber formed by the wall 46 into two part-chambers 50, 51. The design of the pressure reducer according to the invention makes it possible to reduce the size of these two chambers without incurring any disadvantages whatever.

The two ends of screen-like elements 42, 43 are held securely in the grooves in wall surfaces 52, 53 associated therewith, care being taken to ensure a satisfactory seal at the locations in question. In order to prevent the mesh in screen-like elements 42, 43 from becoming blocked, the mesh in them is larger than that in dirt-trapping screen 23.

We claim:

1. A pressure reducer for fluid flow consisting of a housing having an inlet and an outlet, said housing having an internal valve disc, a biased resilient diaphragm exterior of said valve disc, a movable valve stem extending into said housing through said valve disc in sealed relationship thereto, one end of said valve stem being secured to said diaphragm opposed to the bias, the other end being located in said inlet, a movable tubular member having one end engageable with said valve disc, the other end of said tubular member extending into said inlet in sealing engagement thereto, said other end of said tubular member being secured to said other end of said valve stem, the surface of said one end of said tubular member which is subjected to fluid pressure being equivalent to the combined surfaces of said other end of said tubular member and connected valve stem which are subjected to the opposed fluid pressure caused by flow into said inlet.

2. A pressure reducer according to claim 1 wherein said surface of said one end of the tubular member is provided by an outwardly extending flange, the underside of which provides a shoulder acted on by back pressure.

3. A pressure reducer according to claim 1 wherein said one end of tubular member is expanded to form a nozzle.

4. A pressure reducer according to claim 2 wherein the valve disc has a sealing edge adapted to bear entirely against said flange.

5. A pressure reducer according to claim 2 wherein the outward end of said flange is cross sectionally wedge shaped.

6. A pressure reducer according to claim 2 wherein the flange is provided with a high lift edge.

7. A pressure reducer according to claim 1 wherein said valve-disc is located in a retaining flange sealably secured to said housing.

* * * * *